United States Patent [19]

Hautemont

[11] Patent Number: 4,840,555

[45] Date of Patent: Jun. 20, 1989

[54] INSTALLATION FOR THE SIMULTANEOUS THERMOFORMING OF AT LEAST ONE ROW OF CONTAINERS IN THERMOPLASTIC MATERIAL, EACH CONTAINER BEING PROVIDED WITH A DECORATIVE BANDEROLE

[75] Inventor: Jean-Claude Hautemont, Gif-sur-Yvette, France

[73] Assignee: Societe a Responsabilite Limitee, Les Ulis Cedex, France

[21] Appl. No.: 281,789

[22] Filed: Dec. 9, 1988

[30] Foreign Application Priority Data

Dec. 11, 1987 [FR] France .................................. 87 17355

[51] Int. Cl.$^4$ .............................................. B29C 51/02
[52] U.S. Cl. ..................................... 425/500; 264/322; 425/185; 425/383; 425/508; 425/510
[58] Field of Search ............... 425/383, 508, 384, 505, 425/500, 501, 506, 510, 512, 289, 294, 301, 407, 416, 423, 182, 184–186, 192; 264/509, 250, 241, 259, 267, 297.8, 322; 428/35, 36; 215/1 C

[56] References Cited

U.S. PATENT DOCUMENTS

| | | | |
|---|---|---|---|
| 4,009,981 | 3/1977 | Rosen | 425/384 X |
| 4,666,394 | 5/1987 | Wakamiya et al. | 425/384 X |
| 4,674,972 | 6/1987 | Wagner | 264/322 |
| 4,758,145 | 7/1988 | Hautemont | 264/322 X |

FOREIGN PATENT DOCUMENTS 2034915 12/1970 France .
2425926 12/1979 France .
2454892 11/1980 France .

Primary Examiner—Richard L. Chiesa
Attorney, Agent, or Firm—Mason, Fenwick & Lawrence

[57] ABSTRACT

An installation is characterized in that a molding unit is fixed in unremovable fashion on a supporting unit equipped with means for controlling the vertical movements of banderole shaping members; the carriage of the banderole introduction and transverse cutting unit comprises two partial carriages placed one behind the other; the first partial carriage is fastened removably onto the supporting unit; the second partial carriage is coupled to one lateral end of the first partial carriage; and the supporting unit is removably mounted on the press table and can move thereon parallel to the direction of motion of the partial carriages.

18 Claims, 12 Drawing Sheets

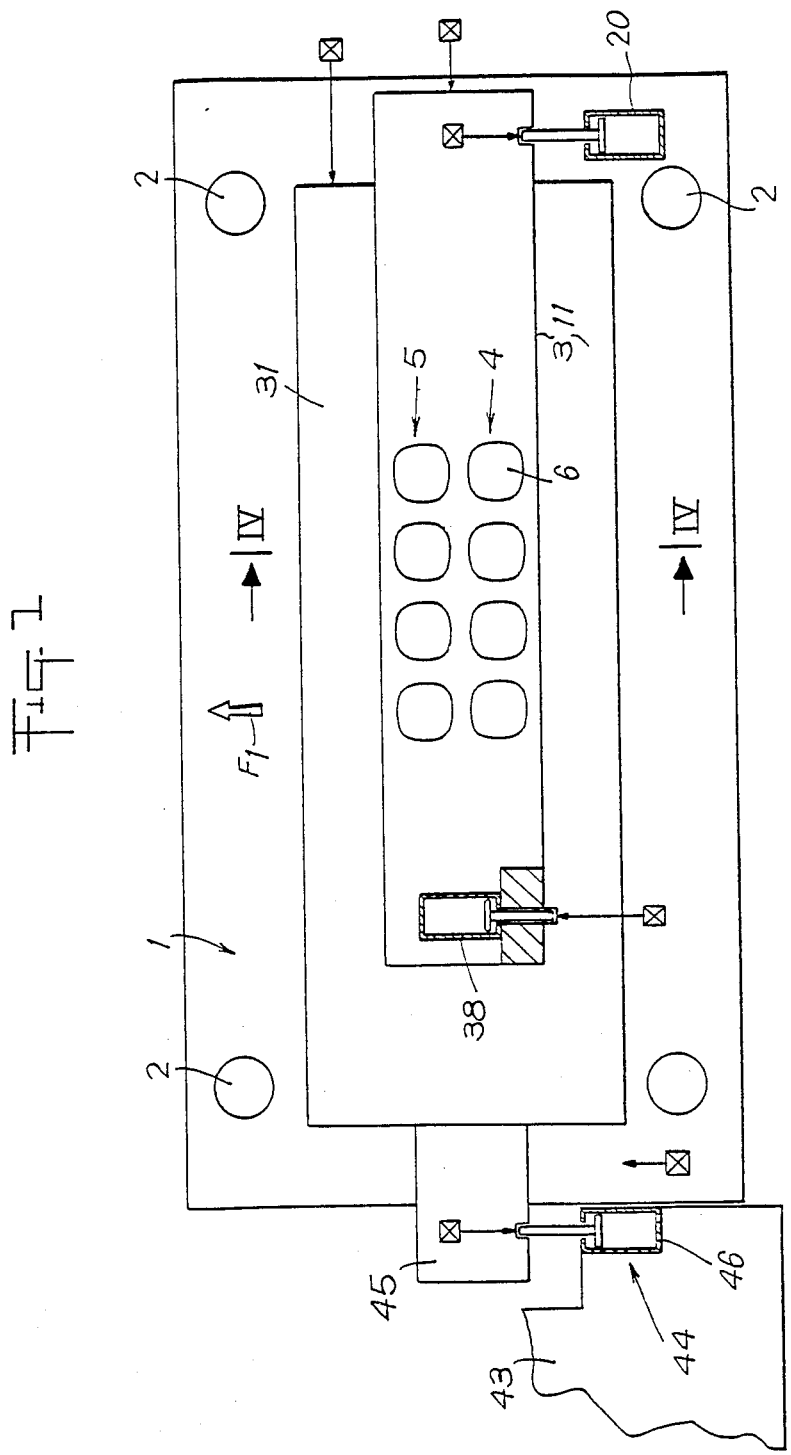

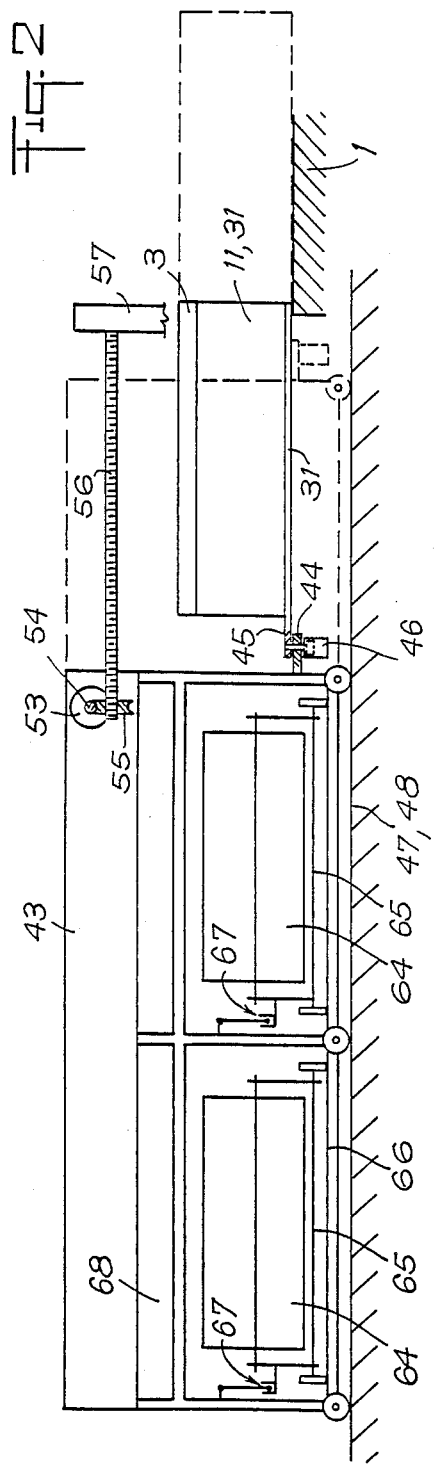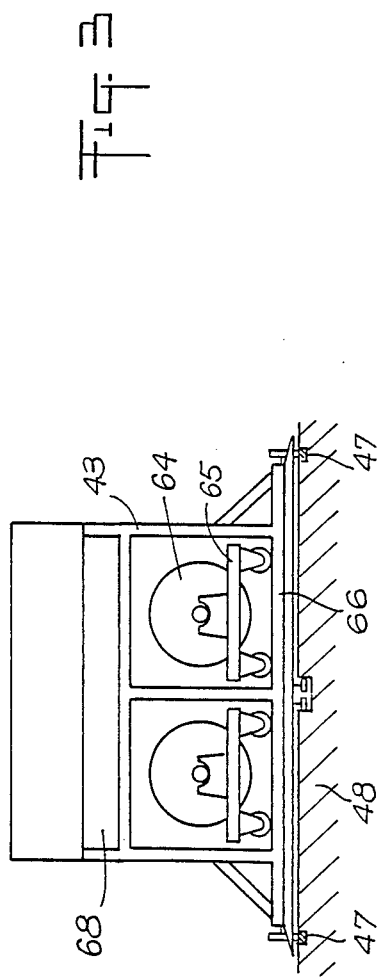

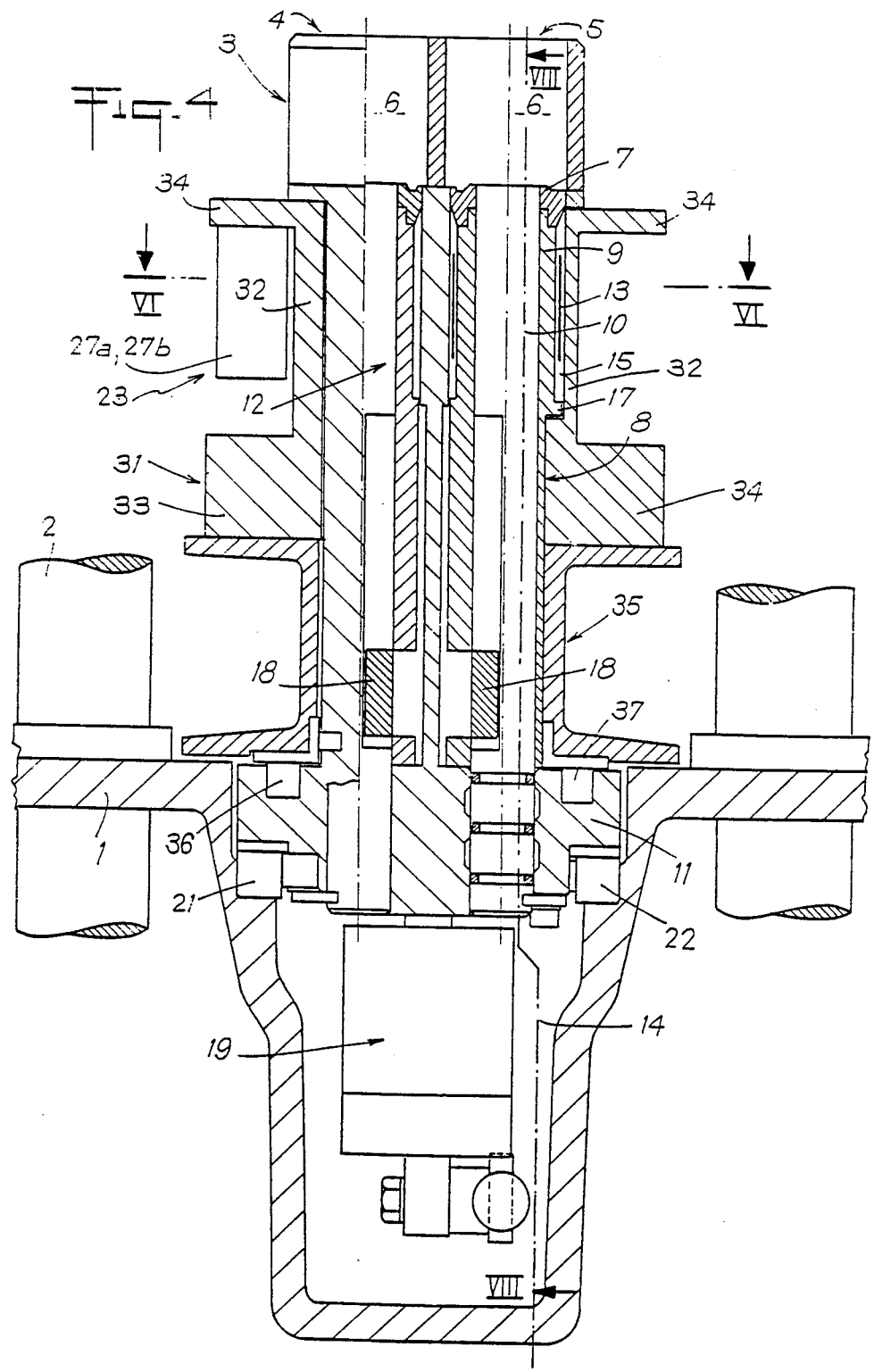

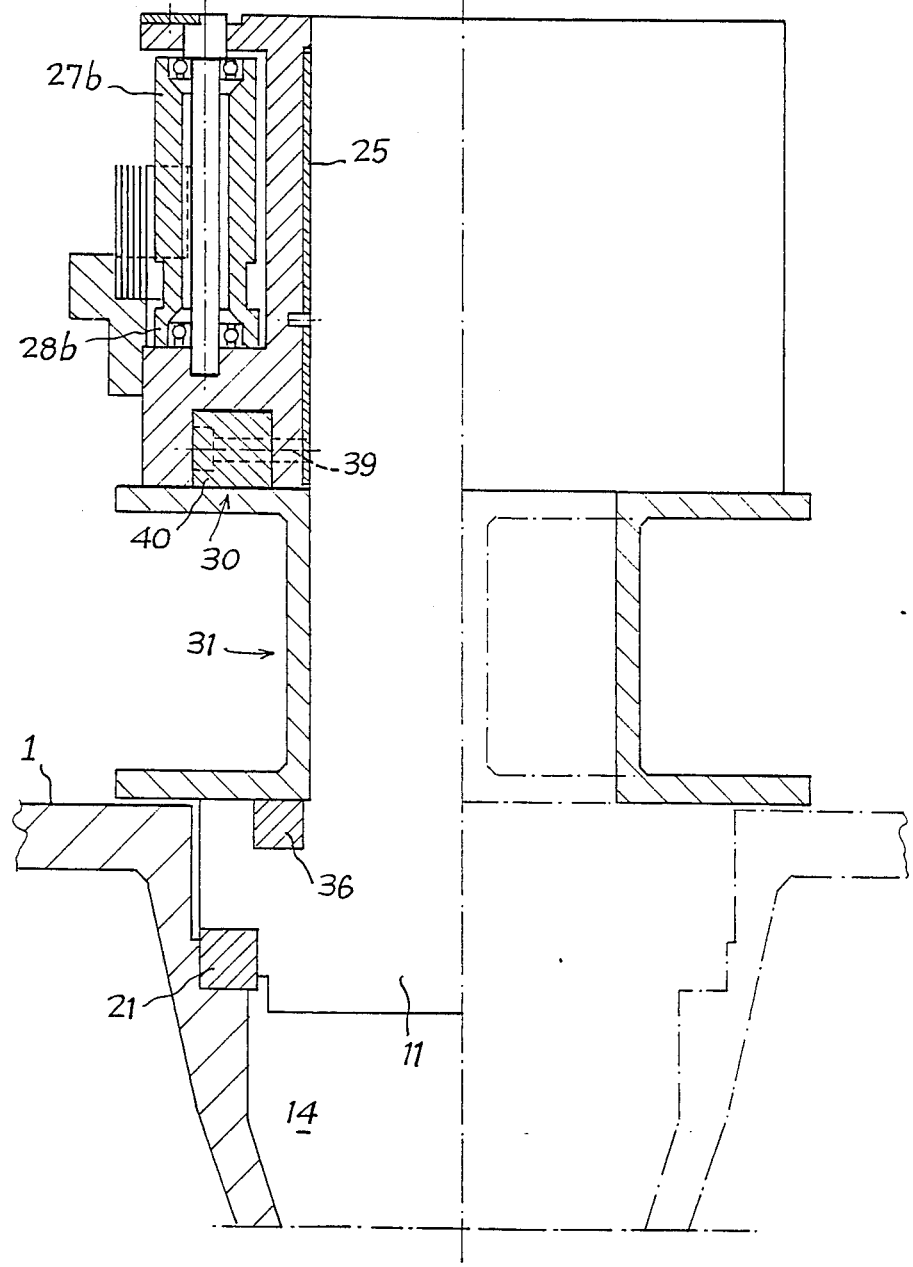

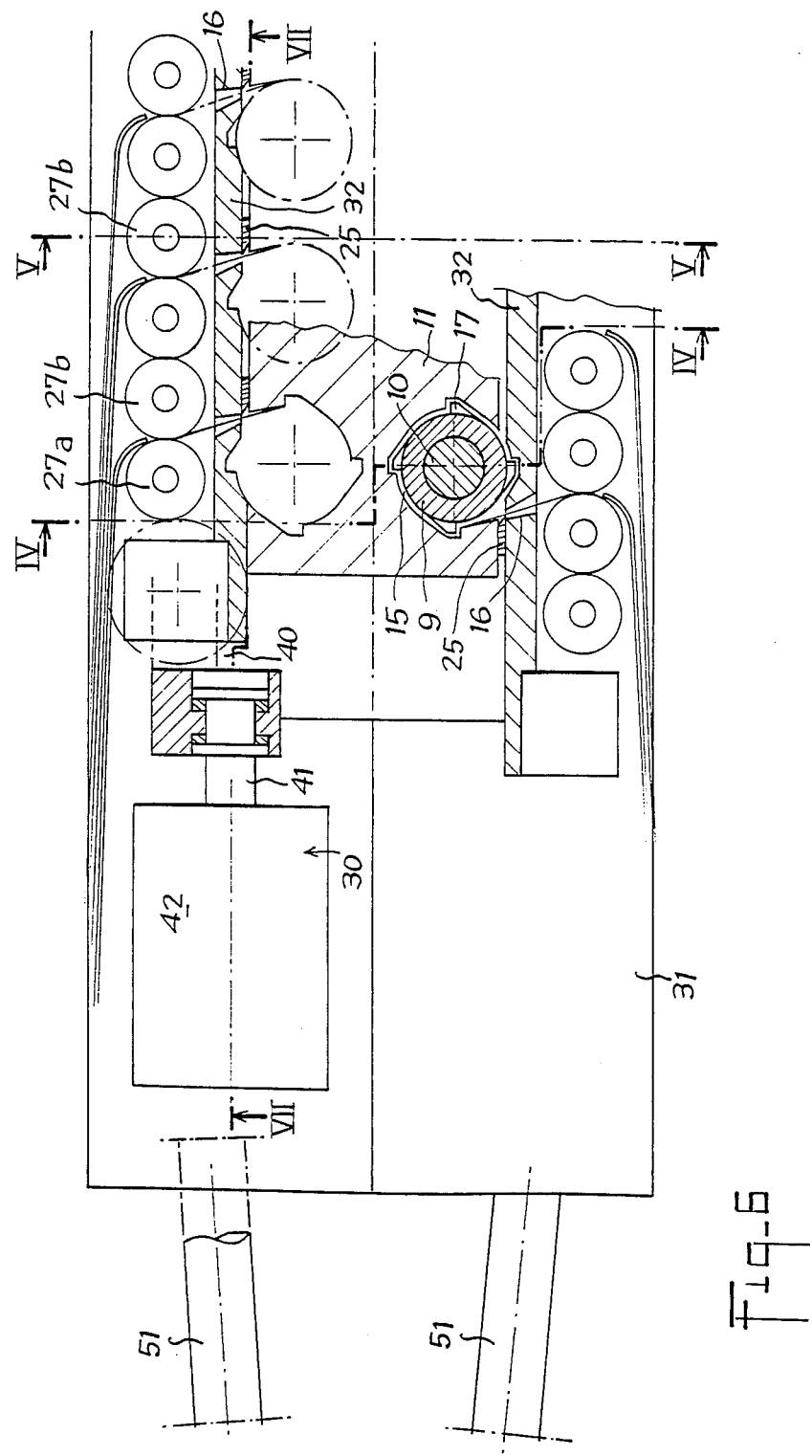

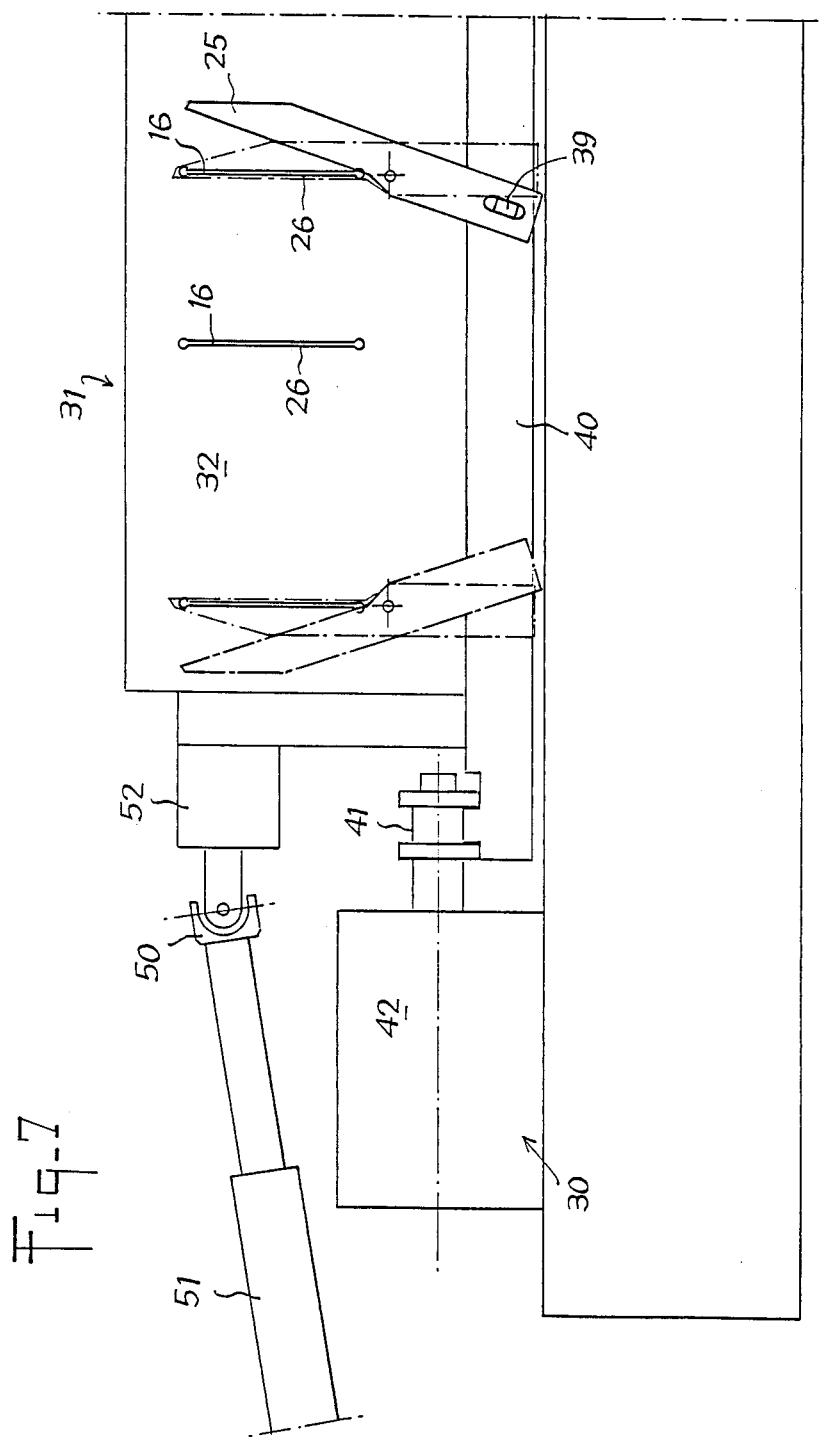

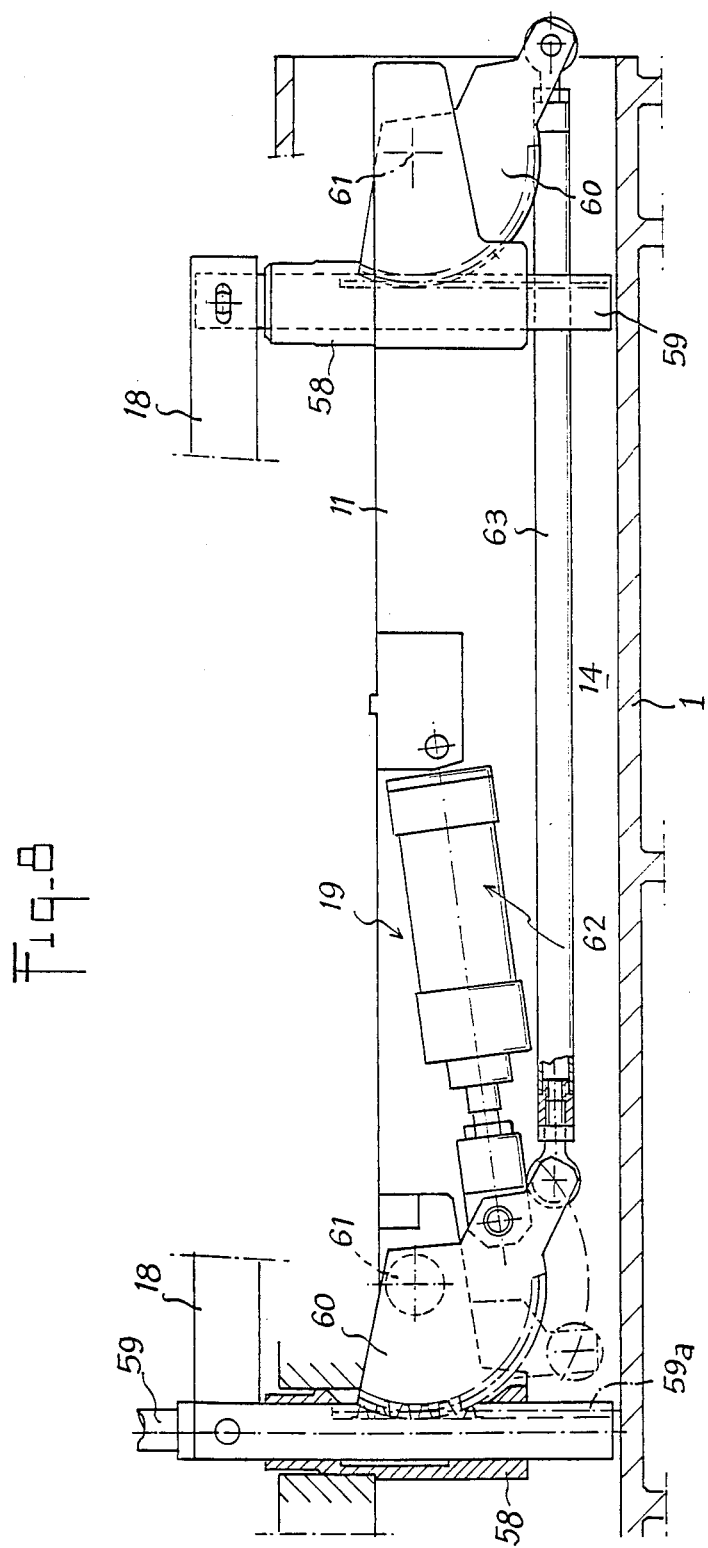

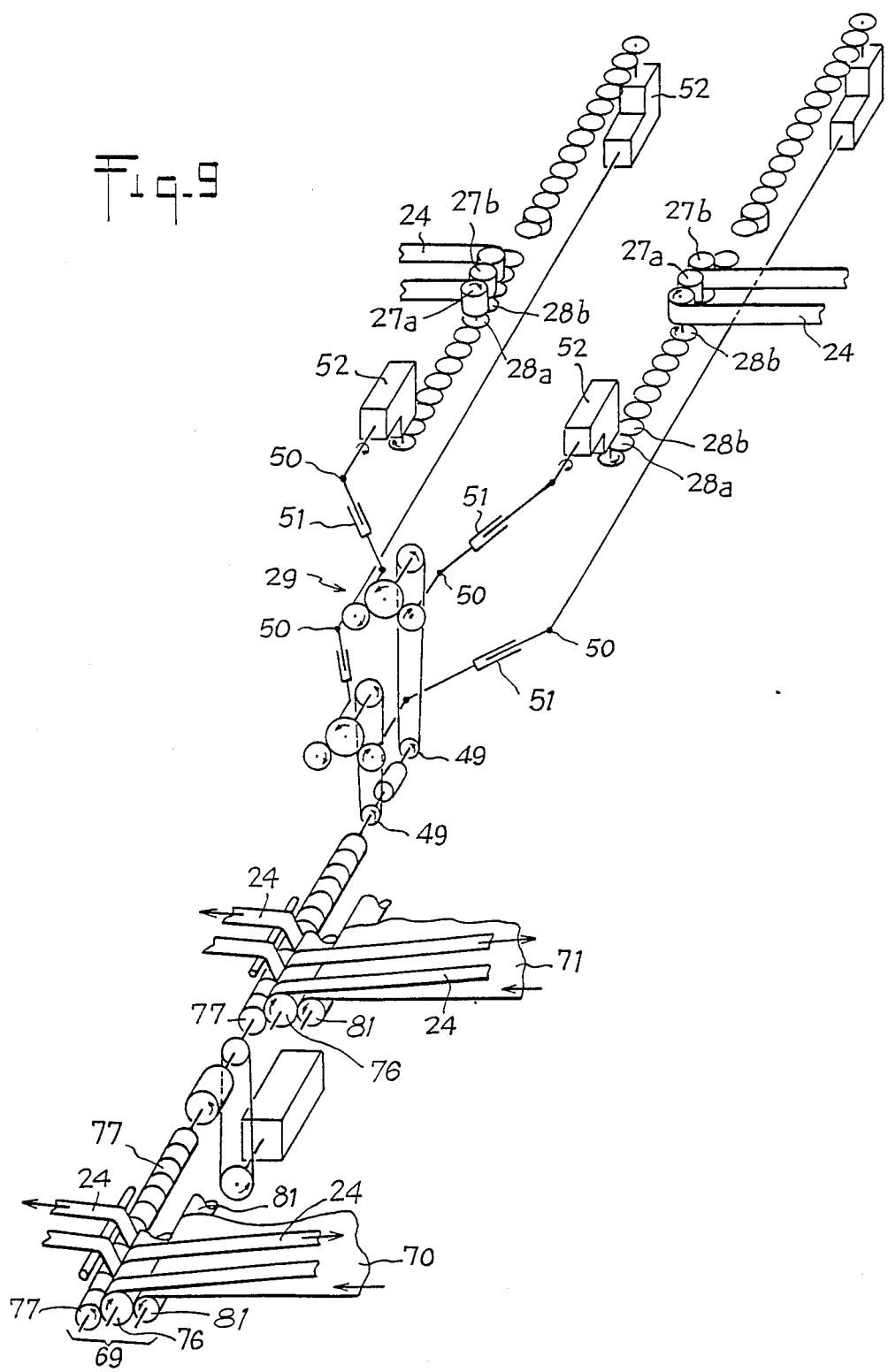

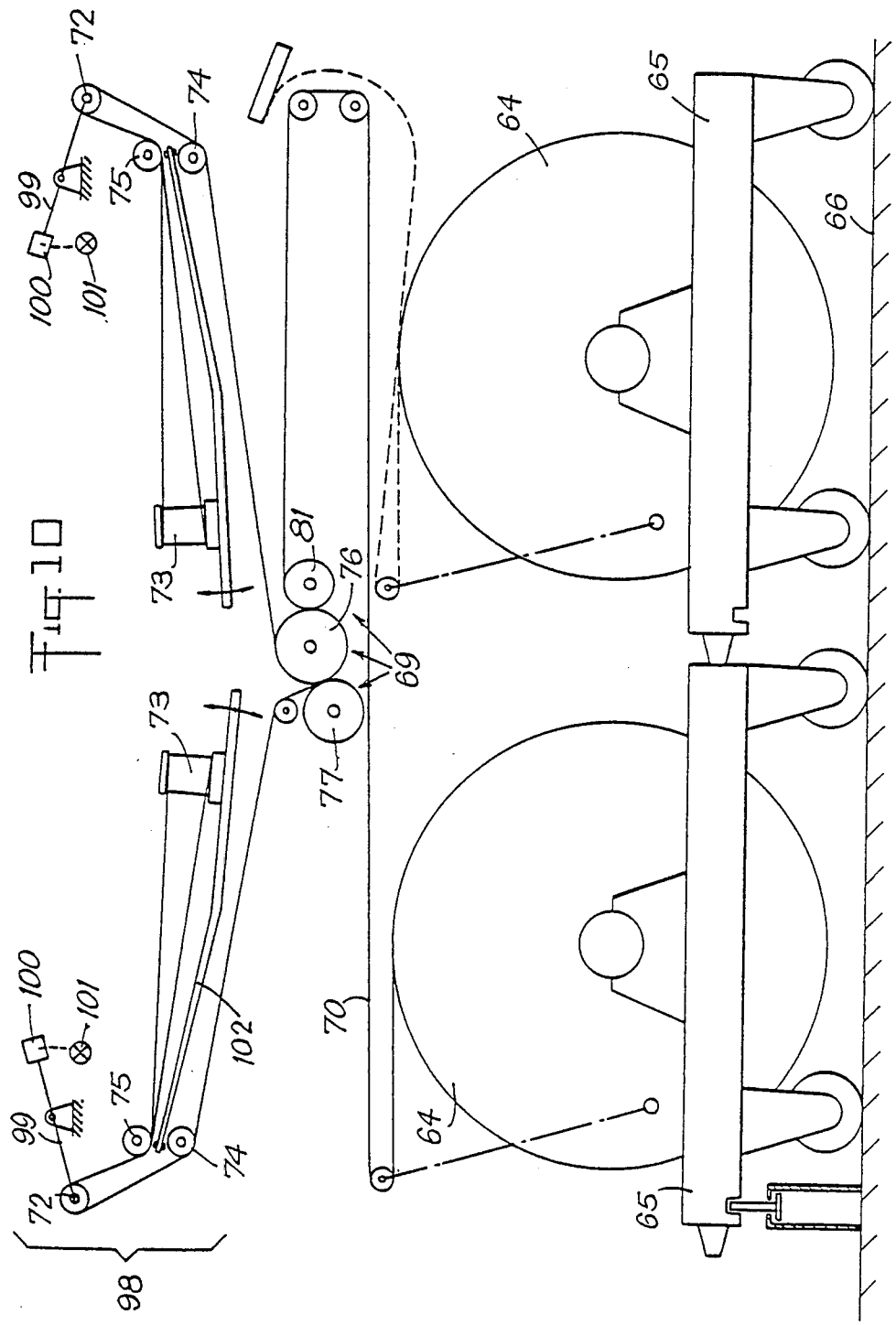

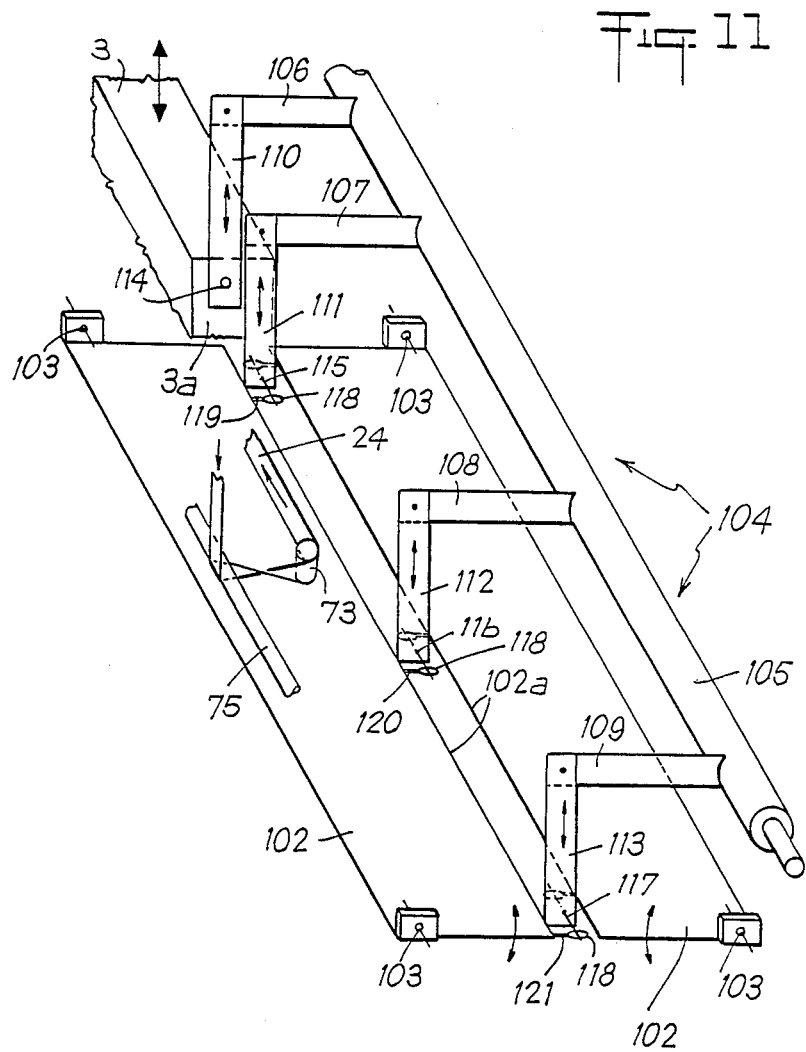

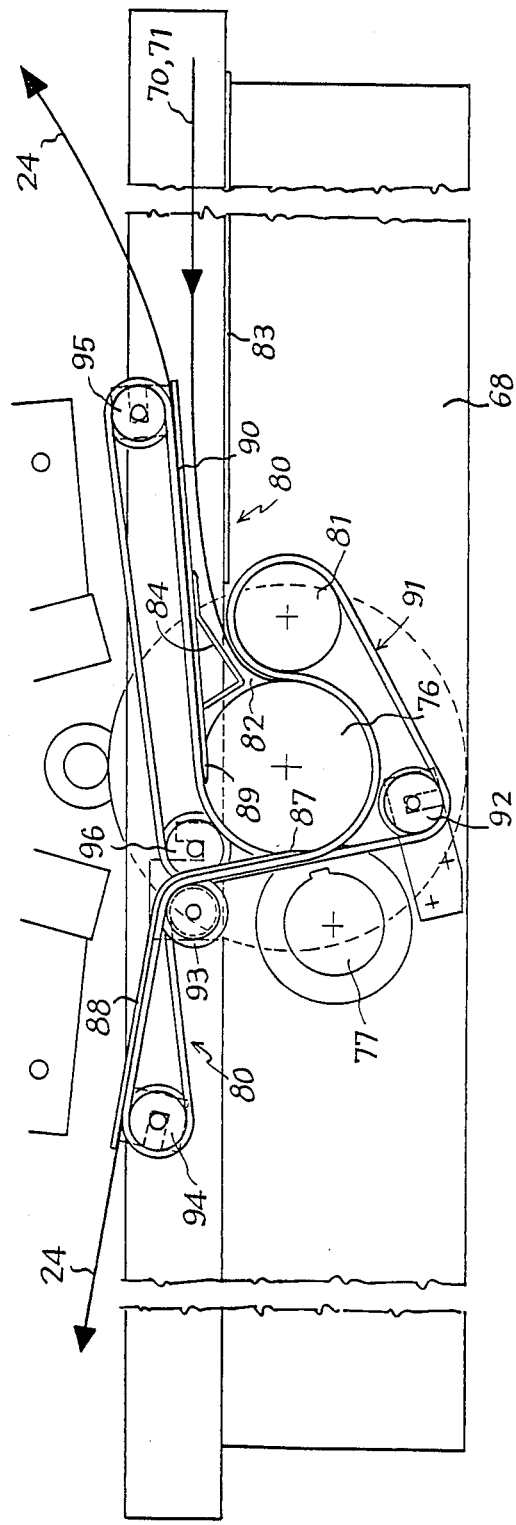
Fig_12

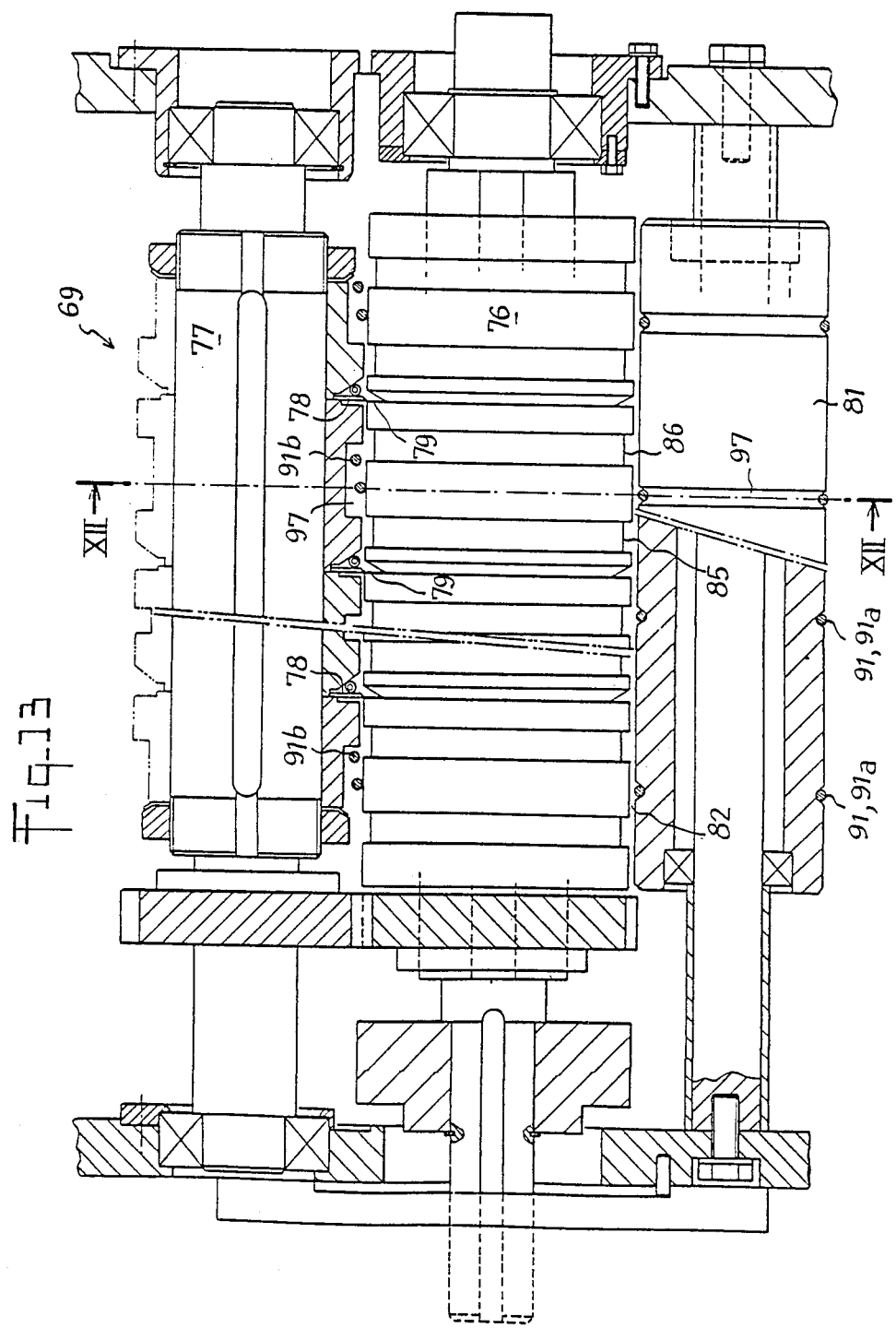

INSTALLATION FOR THE SIMULTANEOUS THERMOFORMING OF AT LEAST ONE ROW OF CONTAINERS IN THERMOPLASTIC MATERIAL, EACH CONTAINER BEING PROVIDED WITH A DECORATIVE BANDEROLE

FIELD OF THE INVENTION

The present invention relates to an installation for the simultaneous thermoforming of at least one row of containers in thermoplastic material, in which each one of the containers are provided with a decorative banderole, installation of the type comprising:

a thermoforming station through which is fed step-by-step a thermoforming band pre-heated to its forming temperature, and which comprises, under the path of said thermoplastic band, a molding unit equipped with a plurality of vertical cylindrical forming chambers disposed in at least one row transversal with respect to the horizontal step-by-step feeding direction of the thermoplastic band, said chambers being open at their top part and having at their lower end, an opening adapted to be closed off by a bottom element movable with respect to the molding unit, so as to be capped by the corresponding molding unit which rests on a press table, vertically movable between a high or thermoforming position and a low or container-stripping position, and a device for cutting, preforming and transferring the banderoles in the forming chambers of the forming unit, said device comprising, from upstream to downstream, in the moving direction of the banderoles:

a roller supporting a reel of master-band, said roller being mounted on bearings on either side of the reel, a cutting unit for longitudinally cutting the master-band into individual bands, said unit being mounted on a supporting frame laterally spaced from the molding unit, at least one guiding roller of adjustable position for each individual band, a prewinding unit for pre-winding the decorative banderoles, said unit presenting inside a supporting unit which is placed under the molding unit:

(a) a plurality of vertical cylindrical pre-winding chambers, each one in alignment with one of the forming chambers so that the vertical wall of each pre-winding chamber defines a contour which is homothetic to that of the forming chamber, yet slightly smaller than the contour of the latter, thus constituting by its upper edge, an annular holding shoulder which also defines the bottom opening of the forming chamber.

(b) a shaping member having a rod which traverses the pre-winding chamber and forms with the vertical wall thereof a narrow annular pre-winding and guiding chamber, and of which the upper part, on the one hand, constitutes at least part of the bottom plate and has a cross-section of similar yet smaller shape than that of the vertical wall of the forming chamber, so that the distance between the vertical wall of said forming chamber and the peripheral face of the upper end of the shaping member is at least equal to the thickness of a banderole, and on the other hand, is adapted to penetrate into the forming chamber and to apply said banderole and keep it applied against the vertical side wall of said forming chamber.

(c) a plurality of vertical access slots, each slot being provided in a lateral wall defining part of the pre-winding chambers and issuing obliquely in one of said pre-winding chambers provided in said supporting unit, and (d) a transfer member provided in the pre-winding and guiding annular chamber and fast with the lower part of the rod of the shaping member, said transfer member being adapted to support the banderole until the latter has been transferred to the forming chamber by a relative movement between said transfer member and said forming chamber, and a banderole introduction and transverse cutting unit comprising:

(a) a plurality of knives, each one of which is adapted to cooperate with a counter-blade for transversely cutting the back end of the banderole introduced at least partly into the corresponding pre-winding chamber, (b) a plurality of pairs of introduction rollers having axes parallel to the vertical introduction slots, each pair being placed upstream of a knife and of an introduction slot and adapted to drive the individual band gripped between its two rollers a step length equal to the length of a banderole, (c) control means for turning the introduction rollers and sequentially actuating the transverse cutting knives, and (d) a supporting carriage, movable horizontally parallel to the plane containing the axes of the chambers of one row of forming chambers, and perpendicular to the thermoplastic band feeding direction, at a right angle to the forming station, said carriage carrying the transverse cutting knives, the pairs of introduction rollers and their control means.

BACKGROUND OF THE INVENTION

Such a thermoforming installation is known, for example, from French Patent No. 2,454,892.

The supporting carriage, according to this document, comprises a horizontal table which, in working position, is situated under the thermoplastic band and which can perform to-and-fro movements perpendicular to the vertical plane defined by the vertical axes of the forming chambers of one transversal row of said chambers, in order to introduce, in each pre-winding chamber, one end of the banderole which will then be held, by air suction, against the rod of the shaping member, and will be entirely introduced into said chamber by a rotation of said rod.

For easier access to the banderole introduction and transversal cutting unit, the supporting carriage can be moved from its working position toward the fixedly installed master-band reel, by being rolled on raised horizontal rails, of which the level of elevation corresponds to the level of the position of the pre-winding chambers, said rails extending in directions parallel to the transversal vertical plane containing the axes of the chambers of one row of pre-winding or forming chambers. Because of the width of the horizontal plate of the supporting carriage and of the existence of said suspended rails, access to the pairs of introduction rollers and to the transverse cutting knives is still a problem, and access to the forming chambers of the molding unit and to the pre-winding chambers of the supporting unit remains difficult.

Moreover, in the known installation, there is no possibility of checking, outside the operative position and in a readily accessible spot, the operation of all the elements contributing to the longitudinal and transversal cutting of a banderole and to the introduction of the latter into a forming chamber of the molding unit.

According to another embodiment, described in French Patent No. 2,425,926, the to-and-fro movement which the supporting carriage plate performs in two opposite directions perpendicular to the vertical plane containing the axes of the forming chambers every time a banderole is introduced in the pre-winding chamber, is avoided by providing the transverse cutting knives on a bar movable in a direction parallel to the row of pre-winding chambers, and by providing the introduction slots on the same movable bar which is moreover fast with the molding unit. But in such a case, the free end of the individual band from which the banderoles are transversely cut, has to be withdrawn from the slot, in order not to be damaged in any way when the molding unit is lowered to the stripping position. Indeed, any damage on the end of an individual band will make its reintroduction into the access slot difficult. Hence the impossibility, with this known mechanism, to attain high working rates.

SUMMARY OF THE INVENTION

It is the object of the present invention to eliminate the aforesaid drawbacks and to propose a thermoforming installation in which the different elements performing the transverse cutting of the banderoles as well as their preforming and their introduction into the forming chambers, are not only readily accessible, but can also be set to work outside their normal working position in the thermoforming installation.

This object is reached according to the invention, due to the fact that:

the molding unit rests on the press table via the supporting unit of the banderole transfer and pre-winding unit, and is fixed in normally unremovable fashion on the upper end of said supporting unit;

the movable carriage of the banderole introduction and transverse cutting unit consists of two partial carriages, placed one behind the other in the direction of one row of pre-winding chambers, of which the first partial carriage rests, in operative position, entirely on at least one lower horizontal slide rail of the supporting unit and is removably fixed on the latter and presents a vertical wall which is equipped with slots giving access to the pre-winding chambers, defines a lateral part of said chambers, and comprises, upstream of each slot, one of the pairs of introduction rollers, and downstream of said slot, a transverse cutting knife which cooperates with an edge of said slot, acting as a counter-blade, and means for controlling said transverse cutting knives, whereas the second partial carriage, firstly, is guided on rails provided on the surface on which rests the thermoforming installation and extending parallel to the guide rail of the first partial carriage, and secondly, comprises the rotation control means of which the output is connected via a universal drive and telescopic shaft type connection, to the input of the transmission mechanism provided on the first partial carriage and cooperating with said pairs of introduction rollers, the supporting unit is removably mounted on the press table and is adapted to move on said table in a horizontal direction parallel to the moving direction of the two partial carriages, and rests on horizontal guide rails of the press table which are parallel to the horizontal rail or rails provided for the first partial carriage and, in operative position, said unit is fast with said press table, the second partial carriage comprises, on the side of the thermoforming installation, a support and lock abutment, adapted to be coupled to one of the lateral ends of the first partial carriage, the second partial carriage is equipped with a driving motor, moving it with respect to the frame of the thermoforming installation, and the supporting unit is equipped with controlling means, controlling the upward and downward movement of the shaping member, part of which control means is situated under said unit and housed in a transversal recess of the press table.

With this particular construction, the first partial carriage has a very small width and, when out of its operative position, is readily accessible since the second partial carriage is always spaced apart from the frontal face of this former; and in such a spaced apart position, also called checking position, the first partial carriage supports only one of its ends, the other end then resting on the unit supporting the banderole transfer and pre-winding unit.

This new construction also provides the possibility of bringing the first partial carriage and the supporting unit, together with the molding unit, out of their operative position, by allowing one of the ends of the first partial carriage normally fixed on the supporting unit, to rest on the support and lock abutment of the second partial carriage, while the other end rests on the press table.

It is in this position that it is possible to check the good operation of all the elements necessary for transversely cutting the banderoles, for introducing them into the preforming chambers and for transferring them into the forming chambers of the molding unit.

Finally, when the first partial carriage is released from the unit supporting the banderole pre-winding and transfer unit, then the first partial carriage can be brought out of one side of the installation, and said supporting and molding units out of the other side of said thermoforming installation.

BRIEF DESCRIPTION OF THE FIGURES

The invention will be more readily understood on reading the following description with reference to the accompanying drawings in which:

FIG. 1 is a diagrammatical plan view of the molding unit and of the press table in the thermoforming station;

FIG. 2 is a transversal front view showing the first and second partial carriages next to the press table of the thermoforming station;

FIG. 3 is an elevational view showing the back end of the second partial carriage;

FIG. 4 is an elevational view of a vertical section through the assembly consisting of the press table, the supporting unit, the molding unit and the first partial carriage, along the broken line IV—IV of FIG. 6;

FIG. 5 is an elevational view of a vertical section cutting through the axis of an introduction roller, along line V—V of FIG. 6;

FIG. 6 is a diagrammatical plan view of a horizontal section through the first partial carriage and the supporting unit, along line VI—VI of FIG. 4;

FIG. 7 is a partly cross-sectional elevational view of part of the first partial carriage, along line VII—VII of FIG. 6;

FIG. 8 is a partly cross-sectional elevational view of the press table and of the means controlling the shaping members, along line VIII—VIII of FIG. 4;

FIG. 9 is a diagrammatical perspective view showing the essential elements for cutting the individual bands and for introducing said bands in banderole form in the pre-winding chambers;

FIG. 10 is a diagrammatical elevational view showing the back part of the second partial carriage on which are provided two supporting carriages for master-band reels and a cutting unit for longitudinally cutting the master-band into individual bands, as well as the system for guiding said bands;

FIG. 11 is a diagrammatical perspective view showing the downstream part of the individual bands guiding system before these are gripped between the pairs of introduction rollers;

FIG. 12 is a diagrammatical view of a cross-section of the longitudinal cutting unit, along line XII—XII of FIG. 13; and FIG. 13 is a plan view of the master-band longitudinal cutting unit.

DETAILED DESCRIPTION OF PREFERRED EMBODIMENTS

The container thermoforming installation, using a thermoplastic band and comprising, successively, a preheating station for preheating the thermoplastic band, a container thermoforming station, a filling station for filling the containers with a product, a sealing station for sealing the containers and a cutting station for the filled and sealed containers, is of a very conventional design, (such as that described for example in French Patent No. 2,034,915) and needs not be described in more details.

The object of the present invention relates more particularly to the thermoforming means and to the decoration of the thermoplastic containers with decorative banderoles.

Referring first to FIG. 1, which diagrammatically shows a press table 1 provided in the thermoforming station, under the path, indicated by arrow F1, followed by the thermoplastic band, not shown in the drawing, said press table being sequentially imparted with an upward movement raising it to a high position or thermoforming position, and with a downward movement lowering it to a low position or stripping position, while being guided vertically by four columns 2.

On said press table 1, is placed a molding unit 3 which preferably comprises two rows 4, 5 of forming chambers 6, which rows extend transversely with respect to the longitudinal extension of the thermoforming installation, i.e. perpendicularly to the thermoplastic band step-by-step moving direction F1.

Each forming chamber 6 of the molding unit comprises a vertical wall, a top opening and a bottom opening, which bottom opening can be closed off by the head 7 of a shaping member 8 which, under said head 7, is equipped with a tubular shaft 9 guided on a vertical solid shaft 10 whose upper end is level with the bottom opening or base of the forming chamber 6 and whose lower end is fast with a supporting unit 11, supporting the banderoles 13 pre-winding unit 12.

As illustrated in, for example, FIG. 4, the molding unit 3 rests on the upper end of supporting unit 11 and is fixed thereon in normally unremovable fashion whereas supporting unit 11 is, by its lower end, removably mounted on the press table 1 which is provided with a transversal recess 14 which is open at the top and at its lateral ends.

The supporting unit 11 of the banderoles 13 pre-winding and transfer unit 12 comprises, under the molding unit 3, as many pre-winding chambers 15 as the molding unit 3 has forming chambers 6. Each of said pre-winding chambers 15 is co-axially in line with one of the forming chambers 6 so that the vertical wall of each pre-winding chamber 15 defines an outline which is homothetic to although slightly smaller than the outline of the forming chamber 6, thereby constituting by its upper edge, an annular holding shoulder which also defines the bottom opening of the forming chamber 6 and prevents the banderole 13 from moving back toward the pre-winding chamber 15.

The tubular shaft 9 of the shaping member 8 comprises, in its middle part which, when its head 7 closes off the bottom of a forming chamber 6, is situated at the lower end of the pre-winding chamber 15 and under the vertical slot 16 giving access into said chamber 15, a plurality of drivers 17 projecting radially from said tubular shaft 9 and designed to act as transfer members and to push the banderole 13 situated in the pre-winding chamber 15 inside the forming chamber 6.

The upward and downward movements of the drivers 17 are controlled by way of a crossbar 18 whose ends are moved vertically by control means 19, means, a part of which is situated under the supporting unit 11 and housed in the transversal recess 14 of the press table 1.

As previously indicated, supporting unit 11 is removably mounted on the press table 1 and can be secured thereon by a locking jack 20 whose cylinder is fast with table 1 and whose rod engages into a notch of the supporting unit. Said supporting unit 11 can move horizontally and in parallel to the vertical plane containing the axes of a row of forming chambers 4 or 5, while resting on horizontal rails 21, 22 provided for guiding the press table 1.

The device for cutting, preforming and transferring the banderoles 13 further comprises a unit 23 for the introduction and transverse cutting of the banderoles 13 from individual bands 24. Said introduction unit 23 is provided with a plurality of transverse cutting knives 25 adapted to cooperate with a counter-blade 26 for cutting transversely the back end of a banderole 13 introduced into the corresponding pre-winding chamber 15 through a vertical access slot 16; a plurality of pairs of introduction rollers 27a, 27b of axes parallel to the vertical access or introduction slots 16 arranged upstream just in front of a corresponding slot 16, each pair being adapted to drive sequentially an individual band 24 gripped between its two rollers 27a, 27b, a step length equal to the length of a banderole 13; gear wheels 28a, 28b, each one being fast with one of the introduction rollers 27a, 27b and meshing one with the other and with a gear wheel of the next pair of rollers 27a, 27b; control means 29, 30 for sequentially driving the knives 25 and gear wheels 28a, 28b; and a first partial support carriage 31 which comprises the access slots 16, the pairs of rollers 27a, 27b, the gear wheels 28a, 28b and part of the control means 29, 30.

Said first partial support carriage 31 comprises a vertical supporting wall 32 arranged against the supporting unit 11 in such a way as to constitute, by one of its vertical faces, part of the vertical wall of the pre-winding chambers 15. As in the illustrated example, the supporting unit 11 comprises two parallel rows of prewinding chambers 15, the vertical supporting wall 32 of the first partial support carriage 31 has a U-shaped horizontal cross-section, said U-shape covering with its flanges the transverse vertical faces of the supporting unit 11 between the upper face of the press table 1 and the upper end of said supporting unit 11. For reasons of technology, the vertical wall 32 is constituted by the base of a U-section 33 of which the lateral flanges 34 extend horizontally away from the supporting unit 11. Said U-section 33 in effect rests by its lower flange on the upper flange of another U-section 35 which is also part of the first partial carriage 31 and which, in operative position, rests entirely by its lower flange, on lower sliding rails 36, 37 of the lower part of supporting unit 11. This first partial carriage 31 may be interconnected with the supporting unit by means of a locking jack 38 whose cylinder is for example fixed on the supporting unit 11 and whose rod engages into a notch of the first partial carriage 31. Horizontal sliding rails 36, 37 are also parallel to the vertical plane containing the axes of the forming 6 and pre-winding 15 chambers.

As illustrated in FIG. 4, the pairs of vertical rollers 27a, 27b are supported by the horizontal upper flange 34 of U-section 33, and are situated at the same level as the pre-winding chambers 15 and the knives 25 situated on the other side of the vertical supporting wall 32 and actuated by means of a knob 39 and of a shaft 40 controlled by the rod 41 of a jack 42 mounted on the first partial carriage 31.

A second partial support carriage 43 is placed laterally with respect to the molding unit 3 and to the feeding direction F1 of the thermoplastic band, in line with the first partial carriage 31. Thus the two partial carriages 31 and 43 are one behind the other in the direction of a row of forming chambers 4 or 5. The second partial carriage 43 comprises, on the side of the thermoforming installation, i.e. opposite the press table 1 and the first partial carriage 31, a support and lock abutment 44 adapted to be coupled to the corresponding lateral end 45 of the first partial carriage 31. Said abutment 44 comprises a locking jack 46 whose cylinder is for example fixed on the second partial carriage 43 and whose rod engages into a notch provided at the lateral end 45 of the first partial carriage 31.

The second partial support carriage 43 is guided on horizontal rails 47 provided on the surface 48 on which rests the thermoforming installation, and extending parallel to the guiding rails 36, 37 of the first partial carriage 31 and to the vertical plane containing the vertical axes of the forming chambers 6 of one row of chambers 4 or 5. On said second partial carriage 43, there is provided a motor or other rotation imparting means 49 whose output is connected, via a connection by universal drive 50 and telescopic shafts 51, to the input of the transmission mechanism 52 provided on the first partial carriage 31 and cooperating via gear wheels 28a, 28b with the pairs of introduction rollers 27a, 27b.

The second partial carriage 43 further comprises a driving motor 53 ensuring its displacement with respect to the thermoforming installation. The output of said motor 53 moves, via a worm 54, a control wheel 55 which is free in rotation yet fast in translation with the second partial carriage 43. Said worm wheel 55 cooperates with a horizontal threaded rod 56 of which one end is fixed on a lateral end plate 57 of the frame of the thermo forming installation, and which extends parallel to the rails 47 of the second partial carriage 43.

As illustrated for example in FIG. 8, the supporting unit 11 comprises on its lower part which penetrates into the transversal recess 14 of the press table 1, the means 19 for controlling the crossbar 18 which ensures the upward and downward movement of the shaping member 8 with respect to the molding unit 3. Said control means 19 comprise, for every row of shaping members 8, two vertical guiding tubes 58 fast with the lower lateral ends of the supporting unit 11, two vertical rods 59, each one sliding in one of the guiding tubes 58, which rods are connected by their upper end to the horizontal crossbar 18 and are provided, at their lower end, with a rack 59a which cooperates with a toothed sector 60, pivotally mounted, on the one hand, on a pin 61 fixed to the supporting unit 11 and, on the other hand, on the rod of a jack 62 whose cylinder is likewise pivotally mounted on said unit 11. A connecting rod 63 links together the two toothed sectors 60 in order to avoid the use of a second control jack.

The second partial carriage 43 is advantageously designed in such a way as to be able to receive a plurality of reels of master-bands 64 (four in the illustrated example), each reel being mounted on a transporting trolley 65 equipped with free wheels which are self-orientable and able to roll on the surface 66 of the second partial carriage 43 while being guided by guiding means 67 which extend parallel to the thermoplastic band moving direction F1 and perpendicularly to the moving direction of partial carriages 31 and 43. The reel of master-band 64 is so placed on the second partial carriage 43 that its axis is parallel to the guide rails 47 of said second carriage 43 and that the axes of the reels 64 in each pair of such reels are aligned.

The second partial carriage 43 advantageously comprises, above the area where the reels of master-band 64 are situated, a chassis 68 supporting the cutting unit 69 used for cutting at least one master-band 70 and preferably two master-bands 70, 71 into individual bands 24, as well as the guiding roller 72 of adjustable position, provided for each individual band 24 and the rollers 73 or return plates 74, 75 for said individual bands.

As particularly illustrated in FIGS. 2, 3 and 9 to 13, the second partial carriage 43 therefore comprises, as longitudinal cutting unit 69, a cylinder with counter-blades 76 and a cylinder with annular blades 77, whose blades 78 cooperate with the counter-blades 79 of cylinder 76. In order to avoid introducing one end of the master-band 70, 71 manually between blades 78 and counter-blades 79, a device 80 is provided for guiding said master-band 70, 71 and the individual bands 24 coming out of the longitudinal cutting unit 69, the role of said guiding device 80 being to return the individual bands 24 alternately toward one side and toward the other, such as to the left and to the right, as illustrated in FIGS. 9 and 10.

It is also worth noting that the cylinders equipped with counter-blades 76 and blades 77 are mounted on the second partial carriage 43 in such a way that their axes are parallel to the guiding rails 47 of said second carriage 43.

Upstream of the cylinder with counter-blades 76 is provided a guiding cylinder 81 forming part of the device 80 and defining with the periphery of the cylinder with counter-blades 76 a passage slot 82. A horizontal guiding plate 83 is placed upstream of the guiding cylinder 81 and moves tangentially close to the upper generatrix thereof. Another guiding plate is placed in inclined fashion above the guiding cylinder and approaches by its lower end the passage slot 82.

Cylinder 76 comprises, between two annular notches acting as counter-blades 79, a pair of annular grooves 85, 86 in which are engaged, on the one hand, opposite and downstream of the contact zones between blades 78 and counter-blades 79, and in each odd pair of grooves, separating claws 87 extended outwardly, to the left, by a guiding plate 88 and, on the other hand, at the upper part of the cylinder with counter-blades 76, in each even pair of grooves, separating claws 89, extended outwardly, to the right, by a guiding plate 90. The master-band 70, 71 and the individual bands are guided towards the cylinders 76, 77 of the longitudinal cutting unit 69 and then towards either side of said unit 69 by a plurality of endless belts 91, of circular cross-section, passing around the guiding cylinder 81 and a plurality of return rollers 92, 93, 94, 95, 96 and between the counter-blades 76 and blades 77 cylinders as well as between the counter-blades cylinder 76 and the guiding cylinder 81. It should be noted that the delivery end of 91a and return end 91b of each endless belt 91 are shifted laterally when they pass between the counter-blades cylinder 76 and the blades cylinder 77 and that said belts 91 are guided at least partly in annular grooves 97 provided either on the guiding cylinder 81, or on cylinders 76 and 77.

It is also advantageous to provide on the second partial carriage 43, a follower device 98 for keeping constant the length of the path of each individual band 24 between the longitudinal cutting device 69 and the corresponding pair of introduction rollers 27a, 27b provided on the first partial support carriage 31.

This follower device 98 consists in the guiding roller 72 adjustable in position and acting also as a tension roller fixed on the end of a double lever 99 of which the other end carries a counter-weight 100, which tension roller, when dropping, passes before a photoelectric cell or other detection element 101 permitting the detection of any discontinuity in the feeding movement of the individual band 24 or any breakage of said band.

The follower device 98 further comprises a pivoting platform 102 articulated by its outer edge on a horizontal pin 103 carried by the second partial carriage 43 and parallel to the guiding rails 47 thereof and to guide rails 21, 22. In effect, said pivot pin 103 coincides with the horizontal axis of return bar 75 which, in FIG. 10, is shown to be situated slightly above the horizontal pivot pin 103. Close to its inner edge, with respect to the vertical plane traversing the axes of the forming chambers of one row of forming chambers 4 or 5, the pivoting platform 102 is equipped with as many return rollers 73 as there are individual bands 24 per row of chambers 4 or 5, but for the sake of clarity, only one roller 73 has been shown in the drawing, the axis of said roller 73 being perpendicular to the pivoting platform 102 whose edge 102a is situated in extension of a row of forming chambers 4 or 5, and when platform 102 is in horizontal position, about half-way up between the high position and the low position of the pairs of introduction rollers 27a, 27b, corresponding respectively to the high thermoforming position and to the low stripping position of the molding unit 3.

In order to follow the upward and downward movements of the molding unit 3, such as indicated by double vertical arrow F2 in FIG. 11, the inner edge of pivoting platform 102 is linked, via a connecting rod 104 to a vertical lateral face 3a of the molding unit 3 or to another element following the upward and downward movements of the latter.

Said connecting rod 104 comprises a pivoting shaft 105 parallel to the pivot pin 103 of platform 102 and carried in bearings, not shown, of the second partial carriage 43. On said pivoting shaft 105 are rigidly fixed a plurality of arms 106, 107, 108, 109, which arms are of identical length and parallel with respect to one another, each one being articulated to the upper end of a connecting plate 110, 111, 112, 113 whose lower end carries a pivot pin 114, 115, 116, 117, all of which pivot pins are parallel to pivot pin 103 and to pivoting shaft 105, and are in alignment one with the other.

Connecting rod 110 which cooperates with the first arm 106 situated near the vertical lateral face 3a of the molding unit 3 is fixed, via its lower pivot pin 114 to said lateral face 3a so that during upward and downward movements of the molding unit 3, pivoting shaft 105 will perform a pivoting movement and transmit said movement to the three other arms 107, 108, 109 which are all firmly interconnected.

The other pivot pins 114, 115, 116, 117 provided in each one of the lower ends of connecting plates 111, 112, 113, are respectively engaged in the oblong hole 118 of one of the three coupling fingers 119, 120, 121 which are fixed on the inner edge 102a in extension of pivoting platform 102 and respectively on the ends and on the middle part of said platform 102. Thus, the upward and downward movements of the molding unit 3 are converted into similar upward and downward movements of the inner marginal part of platform 102 which is then pivoted about its pivot pin 103 while allowing the piece of individual band 24 situated downstream of the last return roller 73 to follow nearly exactly the upward and downward strokes of the corresponding pair of introduction rollers 27a, 27b. The invention is in no way limited to the description given hereinabove and on the contrary covers any modification which can be brought thereto without departing from its scope.

What is claimed is:

1. Installation for the simultaneous thermoforming of at least one row of containers in thermoplastic material, in which each one of the containers are provided with a decorative banderole, installation of the type comprising:

a thermoforming station through which is fed step-by-step a thermoforming band pre-heated to its forming temperature, and which comprises, under the path of said thermoplastic band, a molding unit equipped with a plurality of vertical cylindrical forming chambers disposed in at least one row transversal with respect to the horizontal step-by-step feeding direction of the thermoplastic band, said chambers being open at their top part and having at their lower end, an opening adapted to be closed off by a bottom element movable with respect to the molding unit, so as to be capped by the corresponding molding unit which rests on a press table, vertically movable between a high or thermoforming position and a low or container-stripping position, and a device for cutting, preforming and transferring the banderoles in the forming chambers of the molding unit, said device comprising, from upstream to downstream, in the moving direction of the banderoles:

a roller supporting a reel of master band, said roller being mounted on bearings on either side of the reel, a cutting unit for longitudinally cutting the masterband into individual bands, said cutting unit being mounted on a supporting frame laterally spaced from the molding unit, a pre-winding unit for pre-winding the decorative banderoles, said pre-winding unit presenting, inside a supporting unit which is placed under the molding unit:

(a) a plurality of vertical cylindrical pre-winding chambers, each one in alignment with one of the forming chambers so that the vertical wall of each pre-winding chamber defines a contour which is homothetic to that of the forming chamber, yet slightly smaller than the contour of the latter, thus constituting by its upper edge, an annular holding shoulder which also defines the bottom opening of the forming chamber, (b) a shaping member having a rod which traverses the pre-winding chamber and forms with the vertical wall thereof a narrow annular pre-winding and guiding chamber, and of which the upper part, on the one hand, constitutes at least part of the bottom plate and has a cross-section of similar yet smaller shape than that of the vertical wall of the forming chamber, so that the distance between the vertical wall of said forming chamber and the peripheral face of the upper end of the shaping member is at least equal to the thickness of a banderole, and on the other hand, is adapted to penetrate into the forming chamber and to apply said banderole and keep it applied against the vertical side wall of said forming chamber, (c) a plurality of vertical access slots, each slot being provided in a lateral wall defining part of the pre-winding chambers and issuing obliquely in one of said pre-winding chambers provided in said supporting unit, and (d) a transfer member provided in the pre-winding and guiding annular chamber and fast with the lower part of the rod of the shaping member, said transfer member being adapted to support the banderole until the latter has been transferred to the forming chamber by a relative movement between said transfer member and said forming chamber, and a banderole introduction and transverse cutting unit comprising:

(a) a plurality of knives, each one of which is adapted to cooperate with a counter-blade for transversely cutting the back end of the banderole introduced at least partly into the corresponding pre-winding chamber, (b) a plurality of pairs of introduction rollers having axes parallel to the vertical introduction slots, each pair being placed upstream of a knife and of an introductin slot and adapted to drive the individual band gripped between its two rollers at a pace equal to the length of a banderole, (c) control means for turning the introduction rollers and sequentially actuating the transverse cutting knives, and (d) a supporting carriage, moveable horizontally parallel to the plane containing the axes of the chambers of one row of forming chambers, and perpendicular to the thermoplastic band feeding direction, at a right angle with the forming station, said carriage carrying the transverse cutting knives, the pairs of introduction rollers and their control means, wherein:

the molding unit rests on the press table via the supporting unit and is fixed thereon in normally unremovable fashion;

the movable carriage comprises two partial carriages placed one behind the other following the direction of a row of pre-winding chambers;

the first partial carriage rests, in operative position, entirely on at least one lower horizontal slide rail of the supporting unit and is removably fixed on the latter and presents a vertical wall which is equipped with slots giving access to the pre-winding chambers, defines a lateral part of said chambers, and comprises, upstream of each slot, one of the pairs of introduction rollers, and downstream of said slot, a transverse cutting knife which cooperates with an edge of said slot, and means for controlling said transverse cutting knives as well as a transmission mechansim cooperating with said pairs of introduction rollers;

the second partial carriage, on the one hand, is guided on the surface on which rests the thermoforming installation in parallel to the guide rail of the first partial carriage, and, is adapted to be coupled to one of the lateral ends of the first partial carriage, and, on the other hand, comprises a driving motor ensuring displacement of said second partial carriage with respect to the frame of the thermoforming installation, and rotation control means whose output is connected to the input of the transmission mechanism, and the supporting unit is removably mounted on the press table, is adapted to move on said press table in a horizontal direction parallel to the moving direction of the two partial carriages, and is equipped with means controlling the upward and downward movement of the shaping member.

2. Thermoforming installation as claimed in claim 1, wherein part of the means controlling the upward and downward movements of the shaping member is situated under the supporting unit and is housed inside a transversal recess of the press table.

3. Thermoforming installation as claimed in claim 1, wherein the supporting unit comprises two parallel rows of pre-winding chambers and the vertical supporting wall of the first partial carriage has a U-shaped cross-section, covering with its flanged parts the vertical transversal faces of the supporting unit between the upper face of the latter and the upper face of the press table.

4. Thermoforming installation as claimed in claim 1, wherein the vertical supporting wall of the first partial carriage is constituted by the base of a U-section of which the lateral flanges extend horizontally away from the supporting unit and the pairs of vertical rollers are supported by the upper flange of the U-section and are situated on the same level as the pre-winding chambers and the knives situated on the other side of said vertical wall.

5. Thermoforming installation as claimed in claim 1, wherein the knives are actuated by way of a knob and of a shaft controlled by the rod of a jack mounted on the first partial carriage.

6. Thermoforming installation as claimed in claim 1, wherein the second partial carriage comprises, opposite the press table and the first partial carriage, a support and lock abutment adapted to be coupled to the corresponding lateral end of the first partial carriage.

7. Thermoforming installation as claimed in claim 1, wherein the output of the rotation control means provided on the second partial carriage is connected to the input of the transmission mechanism provided on the first partial carriage, via a universal drive and telescopic shafts connection.

8. Thermoforming installation as claimed in claim 1, wherein the motor driving the second partial carriage comprises as output a worm which actuates a worm wheel which is free in rotation but fast in translation with said second partial carriage and which cooperates with a threaded rod extending in parallel to the guiding rails of the second partial carriage and of which one end is fixed on a lateral end-plate of the frame of the thermoforming installation.

9. Thermoforming installation as claimed in claim 1, wherein the means controlling the upward and downward movement of the shaping members actuate a control crossbar and comprise, for every row of shaping members, two vertical guiding tubes fast with the lower lateral ends of the support unit, two vertical rods, each one sliding in one of said guiding tubes, said rods being joined by their upper end to the horizontal control crossbar and being provided, at their lower end, with a rack which cooperates with a toothed sector articulated, on the one hand, on a pin fast with the supporting unit and, on the other hand, on the rod of a jack whose cylinder is likewise articulated in said unit, a connecting rod linking the two toothed sectors, each one of which cooperates with one of the two vertical rods.

10. Thermoforming installation as claimed in claim 1, wherein the second partial carriage is designed to receive a plurality of reels of master-band, each reel being mounted on a free-wheeled transporting trolley, which is able to roll and self-orientable on the floor of the second partial carriage while being guided by a guiding system extending perpendicularly to the partial carriages' moving direction.

11. Thermoforming installation as claimed in claim 10, wherein each reel of master-band is placed on the second partial carriage in such a way that the axis of the former is parallel to the guiding rails of said second carriage, and the axes of every pair of reels are aligned.

12. Thermoforming installation as claimed in claim 1, wherein the second partial carriage comprises a chassis supporting the unit provided for the longitudinal cutting of at least one master-band into individual bands as well as a guiding roller, adjustable in position for every individual band, and return rollers and bars for the latter.

13. Thermoforming installation as claimed in claim 1, wherein the longitudinal cutting unit comprises two cylinders, of axes parallel to the guiding rails of the second partial carriage, one of the two cylinders being a cylinder with counter-blades and the other cylinder, a cylinder with annular blades, said blades and counter-blates cooperating with one another.

14. Thermoforming installation as claimed in claim 13, wherein the second partial carriage comprises a guiding device operationally coupled to the cylinders of the longitudinal cutting unit, designed to return the cut individual bands, alternately towards one side and the other of said longitudinal cutting unit, and comprising a guiding cylinder defining a passage slot with the periphery of the counter-blade cylinder, a horizontal guiding plate placed upstream of the guiding cylinder and approaches tangentially the upper generatrix thereof, another guiding plate, placed at an angle above the guiding cylinder and, by its lower end, approaching the passage slot, as well as a plurality of pairs of annular grooves, each pair being provided between two adjacent counter-blades of the counter-blade cylinder, in which grooves are engaged, on the one hand, opposite and downstream of the contact zone between blades and counter-blades in every odd pair of grooves, separating claws which are extended outwardly by a guiding plate and, on the other hand, at the upper part of the counter-blade cylinder, in each even pair of grooves, separating claws extended outwardly by a guiding plate.

15. Thermoforming installation as claimed in claim 14, wherein the guiding device further comprises a plurality of return rollers and a plurality of endless belts passing around said rollers and around the counter-blade and blade cylinders, whereas the delivery end and return end of each belt are shifted laterally when passing between the counter-blade and blade cylinders, and said belts are guided at least partly in annular grooves provided either on the guiding cylinder or on the counter-blade or blade cylinders.

16. Thermoforming installation as claimed in claim 1, wherein the second partial carriage comprises a follower device for keeping constant the length of the path of each individual band between the longitudinal cutting unit and the corresponding pair of introduction rollers provided on the first partial carriage.

17. Thermoforming installation as claimed in claim 16, wherein the follower device comprises: a pivoting platform which, close to its outer edge, is pivotally mounted on a horizontal pivot pin carried by the second partial carriage, which pivot pin is parallel to the guiding rails of said carriage and coincides with the horizontal axis of the return bar, said pivoting platform having, close to its inner edge situated in extension of a row of forming chambers and, when the platform is in horizontal position, at approximately mid-distance between the high position and the low position of the pairs of introduction rollers, as many return rollers as there are individual bands per row of chambers, the axis of each of said return rollers being perpendicular to the pivoting platform, as well as a connecting rod linking said platform to the molding unit in order to impart to the latter the upward and downward movements of said molding unit.

18. Thermoforming installation as claimed in claim 16, wherein the follower device comprises a guiding roller, of adjustable position, mounted on the end of a double layer, of which the other end carries a counterweight operationally coupled to detection means provided on the side of the dropping path of said counterweight.

* * * * *

UNITED STATES PATENT AND TRADEMARK OFFICE
CERTIFICATE OF CORRECTION

PATENT NO. : 4,840,555
DATED : June 20, 1989
INVENTOR(S) : Jean-Claude Hautemont It is certified that error appears in the above-identified patent and that said Letters Patent is hereby corrected as shown below: ON TITLE PAGE:

Please change the name of the Assignee from "Societe a Responsabilite Limitee" to --ERCA HOLDING--.

Signed and Sealed this

Twenty-eighth Day of January, 1992

Attest:

HARRY F. MANBECK, JR.

Attesting Officer

Commissioner of Patents and Trademarks